United States Patent [19]

Storz

[11] Patent Number: 4,618,045
[45] Date of Patent: Oct. 21, 1986

[54] FLUID FRICTION CLUTCH

[75] Inventor: Werner Storz, Bennigen, Fed. Rep. of Germany

[73] Assignee: Sueddeutsche Kuehlerfabrik, Julius Fr. Behr GmbH & Co. KG, Fed. Rep. of Germany

[21] Appl. No.: 634,038

[22] Filed: Jul. 24, 1984

[30] Foreign Application Priority Data

Aug. 16, 1983 [DE] Fed. Rep. of Germany ... 8323498[U]

[51] Int. Cl.$^4$ ............................................. F16D 31/00
[52] U.S. Cl. .................. 192/58 B; 192/58 A; 192/82 T
[58] Field of Search .................. 192/58 B, 82 T, 58 A

[56] References Cited

U.S. PATENT DOCUMENTS

| | | | |
|---|---|---|---|
| 4,190,140 | 2/1980 | Konkle | 192/58 B X |
| 4,278,158 | 7/1981 | Martin | 192/58 B |
| 4,381,051 | 4/1983 | Kikuchi | 192/58 B X |
| 4,405,039 | 9/1983 | Hauser | 192/82 T X |

FOREIGN PATENT DOCUMENTS

| | | |
|---|---|---|
| 0070111 | 1/1983 | European Pat. Off. . |
| 2009268 | 2/1970 | Fed. Rep. of Germany . |
| 2439256 | 2/1976 | Fed. Rep. of Germany . |
| 2943841 | 10/1979 | Fed. Rep. of Germany . |
| 2315000 | 6/1976 | France . |

*Primary Examiner*—Larry Jones
*Attorney, Agent, or Firm*—Barnes & Thornburg

[57] ABSTRACT

A fluid friction clutch is provided having an intermediate wall, disposed in a housing and separating the clutch fluid supply or storage space and the clutch fluid working space, with a plurality of overflow openings therein at circumferentially spaced locations. The clutch fluid primarily enters the working space from the storage space through a controllable supply inlet opening in the intermediate wall. The supply inlet is thermostatically controlled by a bi-metal element. A rotating clutch disk is provided in the working space, and at least one clutch fluid return bore is provided in the intermediate wall in the region adjacent the outer circumference of the clutch disk. These return bores provide return guidance for clutch fluid into the storage space.

16 Claims, 4 Drawing Figures

FLUID FRICTION CLUTCH

BACKGROUND AND SUMMARY OF THE INVENTION

The present invention relates generally to clutches and, more specifically, to fluid friction clutches.

Fluid friction clutches are generally known in the art and are often employed in conjunction with radiator fans of combustion engines. Such clutches may serve to control the rotational speed of cooler or radiator fans in response to temperature. Suitable temperature sensing devices for use with fluid friction clutches include bi-metal strips.

However, in typical fluid friction clutches of this type the opening from the clutch fluid supply or reservoir to the clutch fluid working space is in a closed position when the combustion engine is operating at low or idling speeds. Thus, very little clutch fluid remains in the working space, and the fan rotational speed is comparatively low during idling. As a result, when a sudden increase in power occurs there is a significant delay in supplying clutch fluid to the working space and increasing fan rotational speed. This permits the combustion engine to undesirably overheat.

Published European Patent Application No. (EP 70 111 A1) shows another fluid friction clutch having a single inlet bore in the intermediate wall between the working space and the fluid supply space to influence the rotationally dependent function of the clutch. Since a constant flow of clutch fluid must remain, this single inlet bore must have a relatively large diameter. However, this arrangement does not permit even wetting of the clutch disk in the temperature dependent controlled friction clutch. Furthermore, the idling speed of the fan cannot be evenly varied or steplessly increased by changing the diameter or size of this single bore because at and above a certain diameter the idling speed increases erratically.

It is therefore an object of the present invention to provide an inexpensive improved fluid friction clutch.

Another object is the provision of a fluid friction clutch having an increased idling speed with a minimum of structural detail.

A further object is to provide a fluid friction clutch for a combustion engine radiator fan having a minimal delay in increasing fan rotational speed in response to increases in combustion engine power.

These and other objects of the present invention are achieved in the provision of a fluid friction clutch having an intermediate wall, disposed in a housing and separating the clutch fluid supply or storage space and the clutch fluid working space, with a plurality of overflow openings therein at circumferentially spaced locations. The clutch fluid primarily enters the working space from the storage space through a controllable supply inlet opening in the intermediate wall. The supply inlet is thermostatically controlled by a bi-metallic element. A rotating clutch disk is provided in the working space, and at least one clutch fluid return bore is provided in the intermediate wall in the region adjacent the outer circumference of the clutch disk. These return bores provide return guidance for clutch fluid into the storage space.

It has been found to be particularly advantageous to dispose the overflow openings of the present invention toward the outer circumference of the intermediate wall and equally spaced about that circumference. With this arrangement, the clutch fluid within the storage space is formed into a rotating water ring within the housing based upon the rotation of the clutch housing and enters the working space through the overflow openings. It has been determined that by such measures, the idling speed may be increased about 200 to 600 RPM without extensive and expensive structural changes in the clutch.

The even distribution of the overflow openings about the circumference of the adjacent clutch disk results in an even wetting of the clutch disk. Thereby, oil circulation is largely independent from the air temperature. In preferred embodiments of the present invention, three to ten overflow openings are provided and arranged in the central or intermediate disk of the intermediate wall. The controllable supply inlet is also provided in that intermediate disk. This disk is inserted or mounted in a central recess of the cover for the clutch housing. This arrangement provides for ease of assembly and disassembly, particularly for applying additional overflow openings or retrofitting the present invention into existing fluid friction clutches.

The precise size of the overflow openings and particular radial arrangement may be readily determined according to the desired fluid supply in the working space of particular embodiments. It has been found to be particularly advantageous in some embodiments to provide overflow openings each of a 3 mm maximum diameter, and preferably of a 1.5 to 2.8 mm diameter, and whereby the cinematical viscosity of the clutch fluid lies in the range of 30,000 to 50,000 cSt (centiStokes).

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
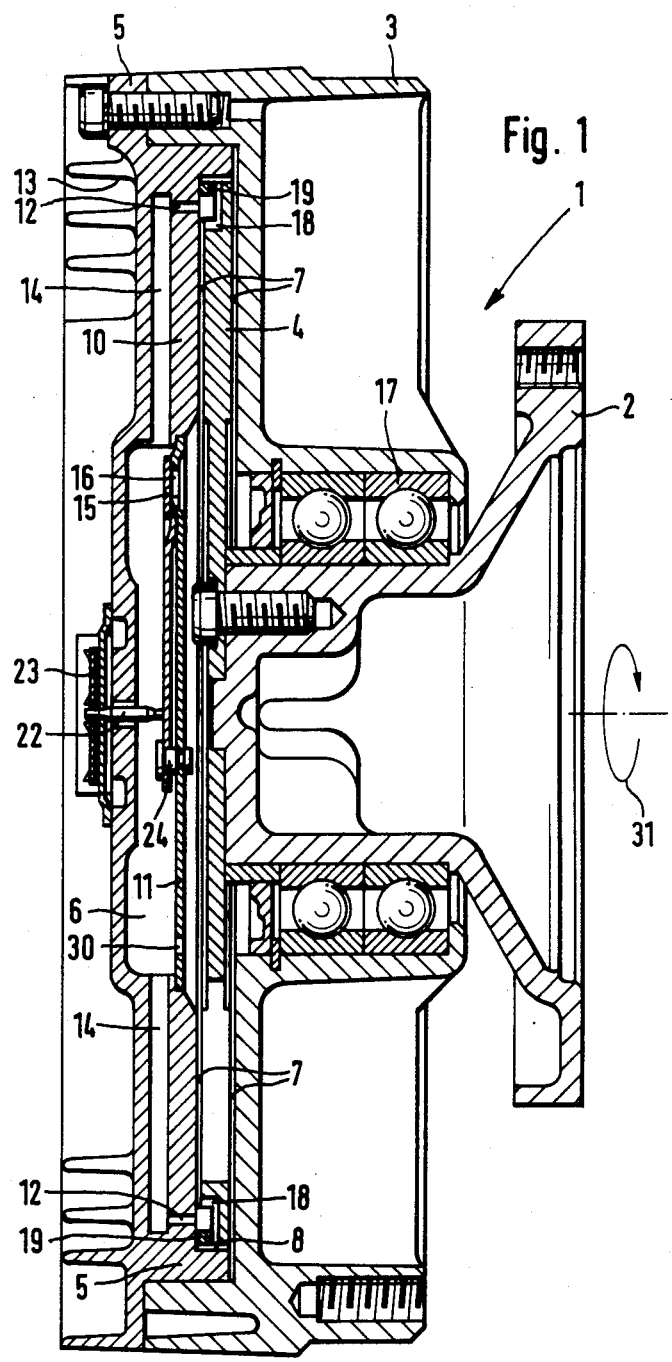
FIG. 1 shows a schematic longitudinal side sectional view through a fluid friction clutch embodying the principles of the present invention.

FIG. 1, which illustrates a preferred embodiment of the present invention, shows a fluid friction clutch 1 having driving flange 2 with a clutch disk 4 threadably attached thereto and forming a primary part. Secondary part 3 is rotatably carried on driving flange 2 by means of ball bearings 17. Secondary part 3 serves as a housing to define working space 7 and storage space 6 for a predetermined amount of clutch fluid. This clutch fluid may be an oil. The spaces are formed by securing cover 5 to rotatably borne second part 3 which is itself provided with a recess forming working space 7. This recess has a thickness conforming generally to that of clutch disk 4 in such a manner that clutch disk 4 is freely rotatably within working space 7.

Working space 7 is separated from storage space 6 by means of an intermediate wall 10 which is part of cover 5. Intermediate wall 10 has a thin wall part 11 installed within and is provided with inlet opening 16 for the clutch fluid supply from storage space 6 to working space 7 and return bores 12 which open into storage space 6 from working space 7 through radially extending channels 14. Inlet opening 16 is closed and opened by means of closing lever 15 which is pivoted about connecting position 24. Movement of closing lever 15 is dependent upon the temperature via actuating rod 22 controlled by bi-metal strip 23. Thus, as the temperature changes, closing lever 15 more or less opens up the connection between storage space 6 and working space 7.

Clutch disk 4 is provided with radially outwardly opened groove 18 in its outer circumferential area into which protrude damming bodies 19 which are fixedly attached to intermediate wall 10. Due to the relative rotation of clutch disk 4 and intermediate wall 10 against each other, the return of the clutch fluid from working space 7 occurs via return bores 12 into storage space 6.

Figure 2:
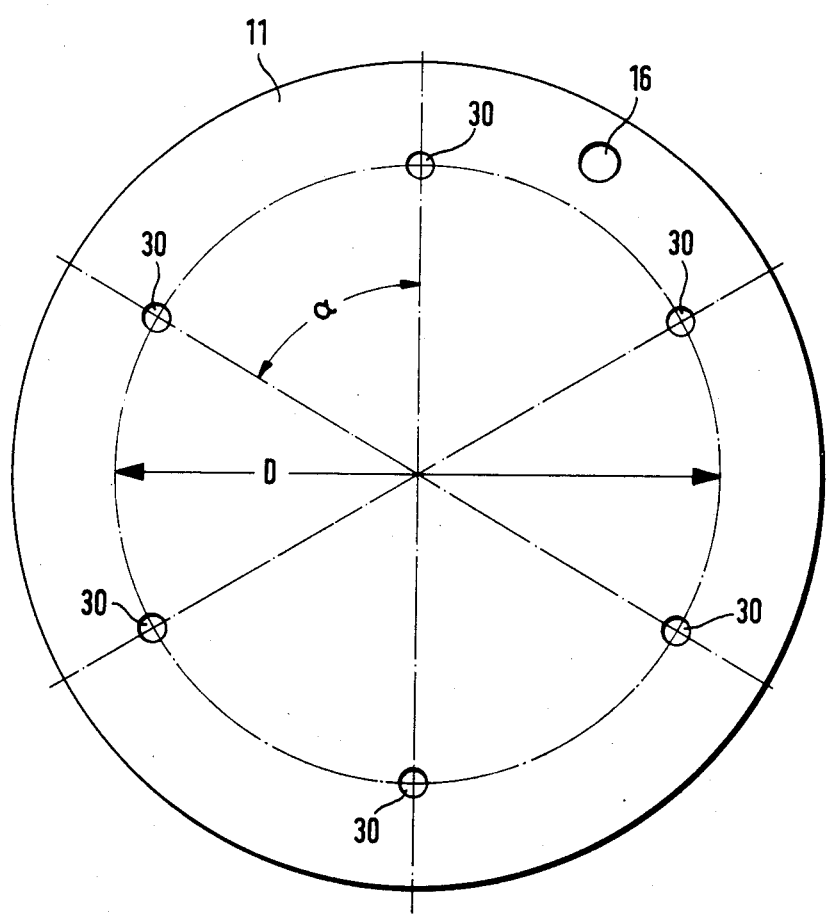
FIG. 2 shows an enlarged front view of the intermediate disk of the fluid friction clutch of FIG. 1.

In preferred embodiments of the present invention, thin wall 11 may be formed as an intermediate disk mounted in a recess of intermediate wall 10. As can be seen especially from FIG. 2 a plurality of overflow openings 30 are provided in intermediate disk 11. In particular, six of these overflow openings are arranged toward the outer circumference of intermediate wall 10 and intermediate disk 11. Each overflow opening 30 is disposed at the same radial distance at the center of intermediate disk 11 and in a 60 degree angle in circumferential direction to adjacent overflow openings. The size of overflow openings 30 and the radial diameter upon which they are arranged are readily determined depending upon the desired amount of return fluid in a particular embodiment of the present invention. These perameters are also dependent upon clutch specifications and characteristics of the existing amount of clutch fluid within the clutch itself and further upon the kind of fluid used. The clutch fluid forms a fluid ring in storage space 6 during rotation of housing 3 and housing cover 5. A diameter of 2.8 mm of overflow openings 30 has been found to be especially advantageous. By evenly distributing overflow openings 30 circumferentially about the face of intermediate disk 11, it has been determined that the surface of clutch disk 4 is evenly wetted even if the fluid return occurs only through a single return bore 12, although as shown in this embodiment, two return bores 12 are positioned diametrically opposite each other. The present invention specifically recognizes, however, that the precise location of overflow openings 11 depends also on the configuration of the clutch disk. These overflow openings may even be arranged at different distances with respect to the clutch disk rotational axis.

Clutch fluid circulation occurs through overflow openings 30 even if inlet opening 16 is entirely covered by closing lever 15. Thus, clutch fluid circulation is somewhat independent of the temperature control provided via by metal strip 23.

Figures 3, 4:
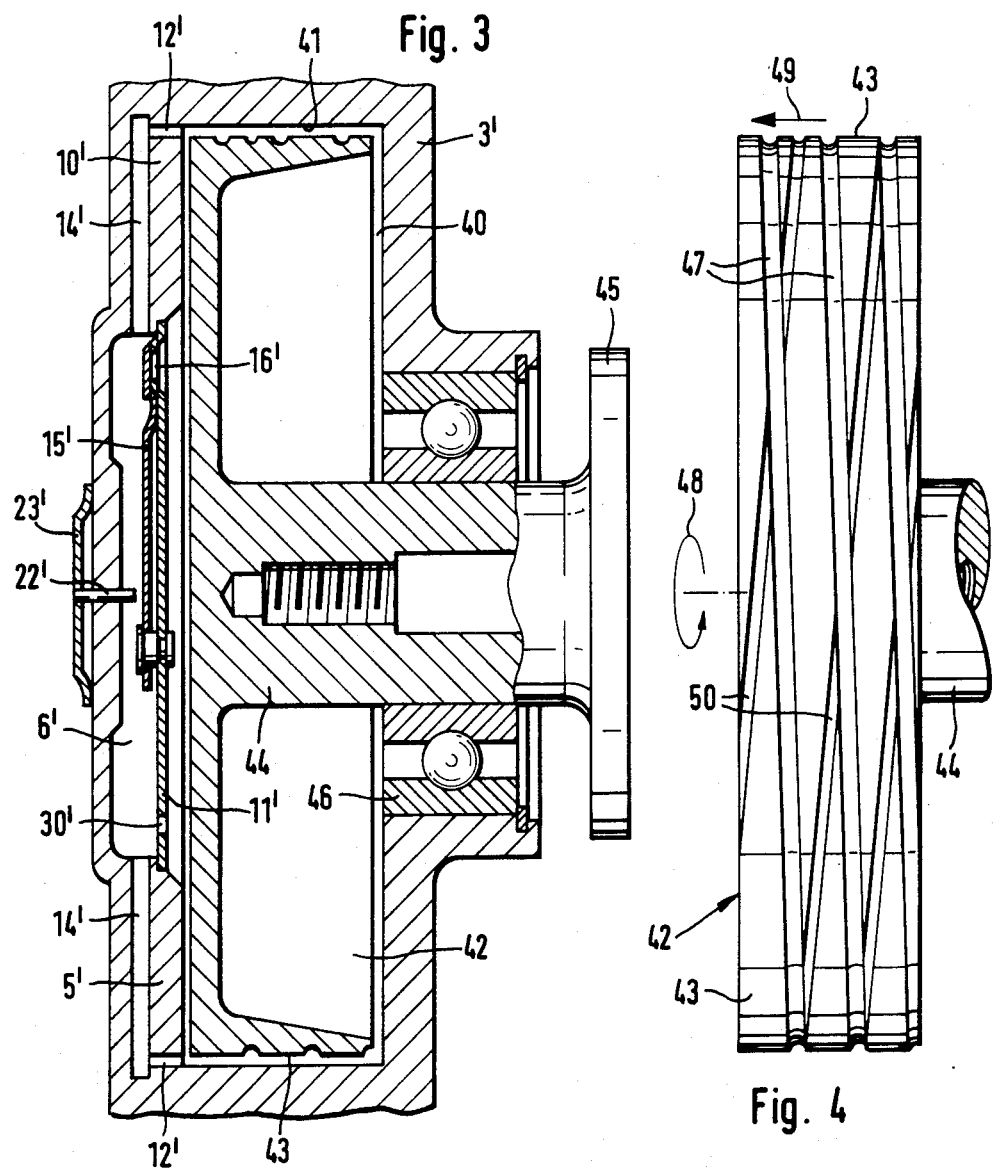
FIG. 3 shows a schematic longitudinal side sectional view through another fluid friction clutch embodying the principles of the present invention.
FIG. 4 shows a schematic side view of the cup disk of the fluid friction clutch of FIG. 3.

The embodiment of the present invention illustrated by FIG. 3 corresponds in many respects to the embodimenet described in FIG. 1. Therefore the same or equally effective component parts are described in FIG. 3 with the same reference numerals as in FIG. 1 with only the addition of a prime. The fluid friction clutch described in FIG. 3 includes secondary part 3' which differs from secondary part 3 described in FIG. 1 in as much as working chamber 40 is provided with cylindrical outer wall 41 which cooperates with cup-like clutch disk 42. Secondary part 3' is, however, as with the embodiment according to FIG. 1 provided with a storage space 6 which functions as a reservoir with a predetermined amount of clutch fluid. Space 6 is defined by cover 5' connected to secondary part 33'.

Working space 40 is divided from storage space 6' by means of intermediate wall 10' having a thinner intermediate disk 11' between storage space 6' and working space 40. Inlet opening 16' is disposed in intermediate disk 11' leading to working space 40 and is closeable by means of closing lever 15' which in turn is controlled by means of actuating rod 22' and temperature responsive bi-metal strip 23'. Overflow openings 30' are provided in intermediate disk 11' through which a certain amount of clutch fluid always enters between storage area 6' and working area 40 independently from the position of closing lever 15'.

Unlike the fluid friction clutch described in FIG. 1 the fluid friction clutch of FIG. 3 is provided with cup shaped clutch disk 42 having cylindrical outer wall 43 which cooperates with cylindrical inner wall 41 of working chamber 40. Clutch disk 42 is connected by root or stem 44 with driving flange 45. The torque of clutch disk 42 is transferred through the thin cylindrical gap or groove between walls 43 and 41 to impart rotation to secondary part 3', which is rotatably mounted or arranged upon root 44 through roller bearing 46. However, it should be noted that the present invention contemplates various other arrangements in direct connection with root 44. Such cup shaped clutch disks are already known in principle.

As shown in FIG. 4, spiral shaped grooves 47 are arranged at cylindrical outer wall 43 of clutch disk 42. Grooves 47 transport clutch fluid between cylinder wall 41 and outer wall 43 above clutch disk 42 in the direction of arrow 49 when clutch disk 42 is rotated in the direction of arrow 48. This fluid is then returned to storage space 6' by means of return bores 12' and channels 14'. Unlike previous fluid friction clutch arrangements, clutch disk 42 of the embodiment of the present invention shown in FIGS. 3 and 4 includes spiral groove 50 arranged upon cylindrical surface 43. Spiral groove 50 extends counter-clockwise to spiral grooves 47 when disk 42 is rotated in the direction of arrow 48 about its rotational axis. The depth of spiral groove 50 is also smaller than the depth of spiral grooves 47 such that with the rotation of clutch disk 42 only a very small portion of the clutch fluid is carried in spiral groove 50 counter-clockwise against the direction of arrow 49. This new counter-clockwise extending spiral groove in connection with overflow openings 30' in intermediate disk 11' provides the advantage that the idling speed is increased with fluid friction clutches having a cup shaped clutch disk.

The clutch fluid, which flows through overflow openings 30' from storage space 6' and through counter-clockwise extending groove 50 into working chamber 40 is slowly pumped out through spiral grooves 47, but remains slightly longer in the working gap or groove between cylindrical walls 41 and 43. Thereby, the rotational speed of the clutch is increased even when closing lever 15' shuts off flow through inlet opening 16'. Where such fluid friction clutches are utilized for radiator of cooling fans, the cooling output can thereby be also increased during idling or low rotational speeds.

In the embodiment of the present invention shown in FIGS. 3 and 4 counter-clockwise spiral groove 50 is double threaded and extends itself over an angle of circumference of 360 degrees. Its depth is about half as much as the depth of spiral groove 47. Grooves 47 are triple threaded over a circumferential angle of about 360°.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A fluid friction clutch having a working space and a storage space, separated by an intermediate wall in a housing for clutch fluid, said intermediate wall including a controllable inlet opening between said storage space and said working space through which said fluid passes, and further having a driven clutch disk rotatable within said working space; clutch fluid return bore means in said intermediate wall adjacent the outer circumference of said clutch disk for return guidance of said fluid to said storage space, and a plurality of non-controllable overflow openings in said intermediate wall, wherein said non-controllable openings are spaced from one another and evenly distributed in circumferential direction with respect to said intermediate wall to facilitate uniform wetting of the clutch disk, said non-controllable opeings being disposed radially inward of the fluid return bore means.

2. The fluid friction clutch according to claim 1, wherein at least three and less than ten of said overflow openings are provided.

3. The fluid friction clutch according claim 1 wherein said overflow openings are each arranged at different radial distances with respect to the rotational axis of said clutch disk.

4. The fluid friction clutch according to claim 1 wherein said overflow openings each have a diameter of between 1.5 and 3.0 mm.

5. The fluid friction clutch according to claim 1 wherein said overflow openings each have a diameter of approximately 2.8 mm.

6. The fluid friction clutch according to claim 1 wherein said housing includes a cover and said intermediate wall includes an intermediate disk with said overflow openings and said inlet opening disposed therein and inserted in a central recess of said cover.

7. The fluid friction clutch according to claim 6 wherein said grooves extending counter-clockwise have less depth than said other grooves.

8. The fluid friction clutch according claim 6 wherein said grooves extending counter-clockwise rearranged to be double threaded over a circumferential angle of about 360 degrees and said other grooves are arranged to be triple threaded over a circumferential angle of about 360 degrees.

9. The fluid friction clutch according to claim 1 wherein said housing includes a cylindrical wall about the periphery of said clutch disk and clutch disk is cup shaped and includes a cylindrical circumferential surface provided with spiral-shaped grooves for the return of said fluid contained in the gap between said circumferential surface and said cylindrical wall, and wherein at least one of said spiral grooves extends counter-clockwise with respect to the extent of other grooves to said circumferential surface.

10. The fluid friction clutch according to claim 1, wherein said return bore means includes at least one bore allowing the return of said clutch fluid from said working space into said storage space.

11. A fluid friction clutch means, for use in the cooling system of a combustion engine to drive a rotating fan in response to combustion engine output, comprising:
a housing having clutch fluid therein and defining a storage space and a working space with an intermediate wall therebetween;
a rotatable clutch disk means, for imparting rotational motion to said housing, extending into said working space; and
said intermediate wall including controllable inlet opening means, for controlling flow of said clutch fluid from said storage space to said working space, clutch fluid return bore means, for guiding said clutch fluid from said working space to said storage space, and a plurality of evenly distributed and circumferentially spaced non-controllable overflow opening means for permitting clutch fluid flow between said storage space and said working fluid space to increase the responsiveness of said fluid friction clutch means to said combustion engine output, said non-controllable openings being disposed radially inward of the fluid return bore means to facilitate uniform wetting of the clutch disk.

12. The fluid friction clutch according to claim 11 wherein said inlet opening means includes thermally responsive flow restricting means for increasing clutch fluid flow therethrough in response to increases in combustion engine output.

13. The fluid friction clutch according to claim 11 wherein said overflow opening means are equally spaced apart toward the circumference of said intermediate wall means and each a preetermined distance from the center of said intermediate wall means.

14. The fluid friction clutch according to claim 11 wherein said clutch disk means includes a cylindrical circumferential surface having a plurality of spiral groove means therein for directing flow of said clutch fluid.

15. The fluid friction clutch according to claim 14 wherein at least one of said spiral groove means extends counter-clockwise with respect to rotation of said clutch disk means and at least another of said spiral groove means extends clockwise with respect to said rotation of said clutch disk means.

16. The fluid friction clutch according to claim 11, wherein said return bore means includes at least on bore allowing the return of said clutch fluid from said working space into said storage space.

* * * * *